US010021885B2

United States Patent
Johnsen et al.

(10) Patent No.: US 10,021,885 B2
(45) Date of Patent: Jul. 17, 2018

(54) MEAT PROCESSING

(71) Applicant: MPSC, Inc., Hudson, WI (US)

(72) Inventors: Justin T. Johnsen, New Richmond, MN (US); William J. Martin, Belgrade, MT (US); Bradley J. Wilesmith, Narrawallee (AU)

(73) Assignee: MPSC, Inc., Hudson, WI (US)

( * ) Notice: Subject to any disclaimer, the term of this patent is extended or adjusted under 35 U.S.C. 154(b) by 0 days.

(21) Appl. No.: 15/690,477

(22) Filed: Aug. 30, 2017

(65) Prior Publication Data
US 2018/0064119 A1    Mar. 8, 2018

Related U.S. Application Data

(60) Provisional application No. 62/383,177, filed on Sep. 2, 2016.

(51) Int. Cl.
*A22B 5/00* (2006.01)
*A22B 5/04* (2006.01)
*A22B 7/00* (2006.01)

(52) U.S. Cl.
CPC .............. *A22B 5/04* (2013.01); *A22B 5/0029* (2013.01); *A22B 5/0082* (2013.01); *A22B 7/004* (2013.01)

(58) Field of Classification Search
CPC .................................... A22B 3/00; A22B 5/04
USPC ......................................... 452/52, 53, 67, 69
See application file for complete search history.

(56) References Cited

U.S. PATENT DOCUMENTS

| | | | | |
|---|---|---|---|---|
| 4,053,963 A | * | 10/1977 | Matheu ..................... | A22B 5/04 27/24.1 |
| 4,270,241 A | * | 6/1981 | Braga ....................... | A22B 5/04 452/69 |
| 4,774,741 A | * | 10/1988 | Bernharadt .............. | A22B 5/00 452/141 |

FOREIGN PATENT DOCUMENTS

EP    0525696 A2    2/1993

OTHER PUBLICATIONS

International Search Report and Written Opinion from related PCT Application No. PCT/US2017/0049903, dated Oct. 20, 2017, 11 pages.

* cited by examiner

*Primary Examiner* — Richard T Price, Jr.
(74) *Attorney, Agent, or Firm* — Brooks, Cameron & Huebsch, PLLC

(57) ABSTRACT

The present disclosure includes improved apparatuses and methods related to meat processing. One example method includes performing a first cut in association with a rinsing process performed on an animal, wherein performing the first cut includes severing at least one jugular vein of the animal; and subsequent to performing the first cut, performing a second cut that includes one of: making an incision in a vena cava of the animal that provides an exit location for treatment solution introduced into a circulatory system of the animal; and severing the vena cava of the animal such that the severed vena cava provides an exit location for treatment solution introduced into the circulatory system of the animal.

19 Claims, 4 Drawing Sheets

300 performing a first cut in association with a rinsing process performed on an animal, wherein performing the first cut includes severing at least one jugular vein of the animal; — 310 subsequent to performing the first cut, performing a second cut that includes one of:
  making an incision in a vena cava of the animal that provides an exit location for treatment solution introduced into a circulatory system of the animal; and
  severing the vena cava of the animal such that the severed vena cava provides an exit location for treatment solution introduced into the circulatory system of the animal. — 320

FIG. 3

MEAT PROCESSING

PRIORITY INFORMATION

This application claims the benefit of U.S. Provisional Application Ser. No. 62/383,177, filed Sep. 2, 2016, the entire specification of which is incorporated herein by reference.

TECHNICAL FIELD

The present disclosure relates generally to improved apparatuses and methods related to meat processing.

BACKGROUND

Treatment of slaughtered animals by introducing (e.g., injecting) a treatment solution into the circulatory system of the slaughtered animals provides for improved meat quality and improved yield. Such processing, also called "rinsing," involves the removal of the blood from the animal and the introduction of the treatment solution into the circulatory system. Rinsing processes can be performed on various animals including, but not limited to, cattle, horses, hogs, poultry, deer, buffalo, and sheep.

Treatment of slaughtered animals is complicated by a number of factors, and rinsing often must be performed under exacting conditions in order to provide for maximum meat quality while complying with health regulations.

BRIEF DESCRIPTION OF THE DRAWINGS

FIG. 3 illustrates an example method for improved meat processing in accordance with a number of embodiments of the present disclosure.

DETAILED DESCRIPTION

The present disclosure includes improved apparatuses and methods related to improved meat processing. One example method includes performing a first cut in association with a rinsing process performed on an animal, wherein performing the first cut includes severing at least one jugular vein of the animal; and subsequent to performing the first cut, performing a second cut that includes one of: making an incision in a vena cava of the animal that provides an exit location for treatment solution introduced into a circulatory system of the animal; and severing the vena cava of the animal such that the severed vena cava provides an exit location for treatment solution introduced into the circulatory system of the animal.

A number of embodiments of the present disclosure can provide benefits such as improved meat quality as compared to prior meat processing approaches, among various other benefits. A number of embodiments include severing a vena cava of an animal, without damaging (e.g., severing) other portions of the circulatory system, as part of a rinsing process. Severing other portions of the circulatory system (e.g., other major veins and/or arteries) can reduce the quality of the rinsing process and/or the quality of the end meat product, because severing such vessels can cause a reduction in the amount of treatment solution delivered to various portions of the animal. For instance, severing a major artery such as the aortic arch might result in a large amount of wasted treatment solution since the solution can exit through the aortic arch without first being delivered to other portions of the circulatory system.

A number of embodiments can also provide benefits related to pressure within the circulatory system during rinsing. For instance, cutting the vena cava may reduce pressure build up within the circulatory system during rinsing, which may result from clotting within other vessels such as jugular veins. As an example, jugular veins can serve as exit locations for treatment solution, so clotting within jugular veins can lead to pressure build up and back up of solution within the circulatory system. Clotting of the jugular vein(s) may occur, for example, since several minutes may pass between cutting of the jugular(s) and introduction of the rinse solution. Providing the vena cava (e.g., superior vena cava) as an additional exit location for treatment solution can relieve such pressure and backup of treatment solution.

Figure 1:
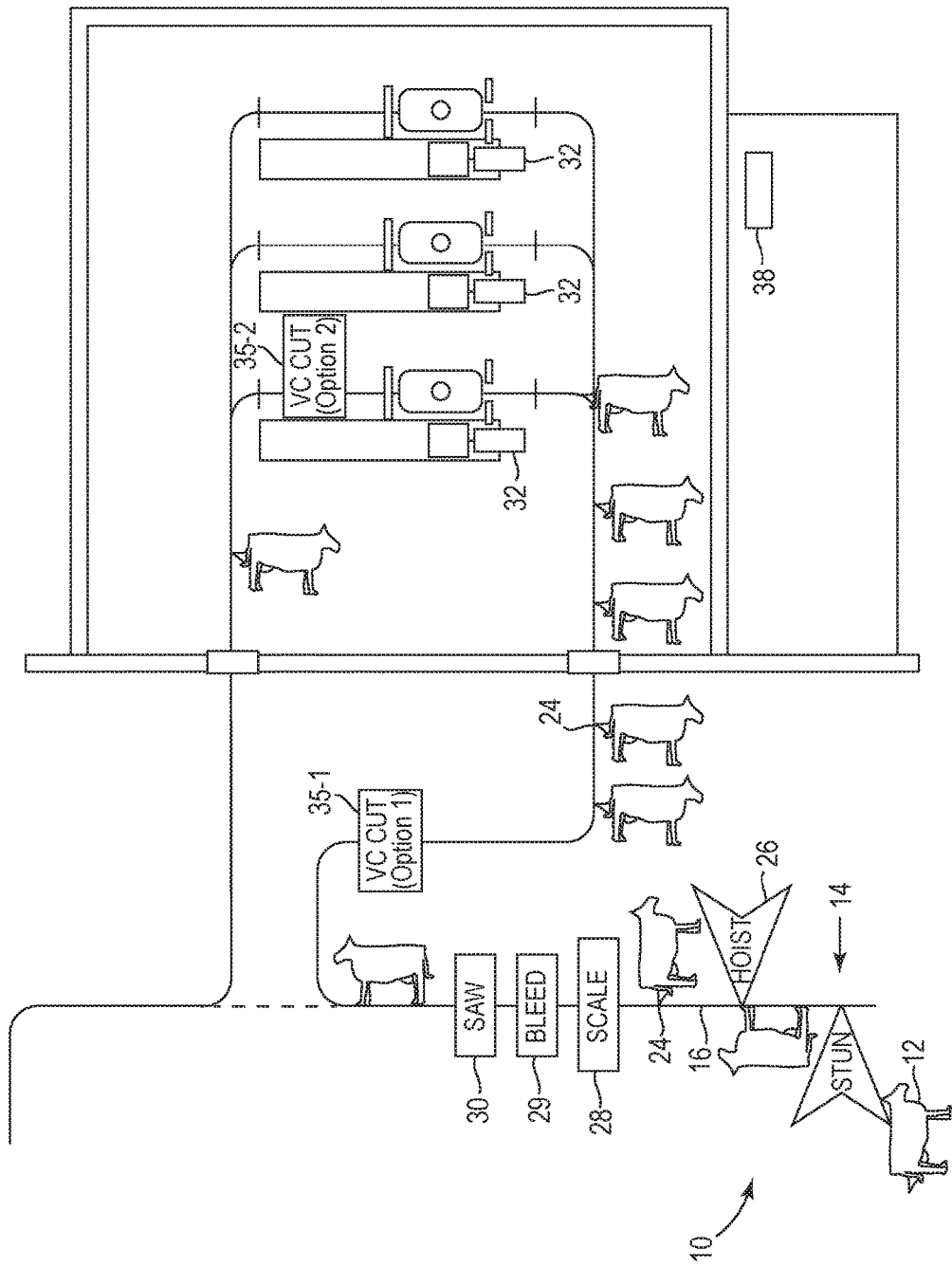
FIG. 1 is a schematic diagram of a system for rinsing animals in accordance with a number of embodiments of the present disclosure.

FIG. 1 is a schematic diagram of a system 10 for rinsing animals in accordance with a number of embodiments of the present disclosure. The system 10 of FIG. 1 illustrates various stages of meat processing on a processing line. Such processing can be controlled with a computer 38, for example.

Initially, an animal 12 can be stunned in a stunning area 14 to render it irreversibly unconscious. Although FIG. 1 illustrates bovine animals, embodiments are not so limited and can also include ovine and porcine animals, among others. The process of stunning the animal 12 for slaughter is known within the art and can include the use of a pneumatic stun gun, captive bolt system, etc. A carrier can then be used to hold the animal for further processing. In the embodiment illustrated in FIG. 1, the carrier is an overhead rail 16 used in conjunction with a number of shackles 24. The carrier can also be a number of cradles, a number of knock boxes, or a moving table, among other carriers.

In the embodiment illustrated in FIG. 1, the stunned animal 12 is attached to a shackle 24 by one of its rear legs. A hoist 26 can be used to hoist the shackle 24 onto the rail 16 to suspend the animal 12 from rail 16 in an inverted position. In some embodiments, the animal 12 may not be shackled to rail 16 but may still be conveyed via a knock box, for instance.

The animal 12 can be conveyed to a scale 28, which can be used to weigh the animal. The weight of the animal can impact certain aspects of the rinsing process such as the amount of treatment solution (which may also be referred to herein as "rinse solution") to be introduced, the length of time treatment solution is introduced, the pressure used during rinsing, etc. In some embodiments, the animal 12 may not be weighed. For example, whether the animal 12 is weighed might depend on the particular rinsing process being used, type of animal, etc.

In various embodiments, the animal 12 can then be conveyed to a bleeding station 29 where a bleeding process can commence. Several bleeding procedures are known in the art. One bleeding method includes a cut across the throat region of the animal to sever both jugular veins and carotid arteries. Another method can involve a "thoracic stick" in which the thoracic region is opened via a cut made from the jaw region to the brisket region, followed by a severing of the brachiocephalic artery. However, severing the brachiocephalic artery can have drawbacks in association with a rinsing process.

The example shown in FIG. 1 includes a saw station 30 to which the animal 12 can be conveyed from bleed station 29. However, as described further below, the saw station 30 can be optional and may depend on the particular type of animal being rinsed and/or on the particular rinsing method being used.

As described further below, in a number of embodiments, the vena cava (e.g., superior vena cava 50 shown in FIG. 2A) of the animal 12 can be cut (e.g., severed or an incision made therein) in association with the rinsing process. The timing of the cutting of the vena cava can vary and can depend on the type of animal, for instance. For example, as shown in FIG. 1 at 35-1, one option is cutting the vena cava subsequent to an initial cut or cuts associated with bleeding the animal at bleed station 29 and subsequent to exposing the chest cavity of the animal at saw station 30, but prior to introducing treatment solution into the circulatory system of the animal 12 as rinse station 32. Another option as shown at 35-2 in FIG. 1 is cutting the vena cava at the rinsing station 32 (e.g., at the time the treatment solution is introduced or during rinsing). Although not shown in FIG. 1, another option is to cut the vena cava at bleed station 29 (along with cutting the jugular veins and/or carotid arteries). At rinsing station 32, residual blood is removed from the animal 12 via the introduced treatment solution. As described above, the cutting of the vena cava as part of the rinsing process can provide various benefits.

One example method in accordance with the present disclosure includes, at bleed station 29, opening up a neck region of an animal (e.g., via a cut from sternum to chin and then performing a cut to sever one or both jugular veins. In this example, a carotid artery may also be severed and may serve as an insertion location for subsequent introduction of treatment solution during rinsing. In this method, the vena cava may also be cut at the bleed station 29; however, it can be beneficial to delay cutting the vena cava until after rinsing begins at rinse station 32. For instance, introduction of the rinse solution into the circulatory system (e.g., via the carotid artery) results in solution flowing through the uncut vena cava, which can assist a worker in locating the vena cava. Accuracy in cutting only the vena cava (without cutting other local major vessels) can provide rinsing benefits as described above. For instance, cutting the vena cava can provide an additional exit location (e.g., an exit location in addition to the jugular veins) for treatment solution (along with residual blood) and can reduce pressure of the treatment solution within the circulatory system of the animal during rinsing.

Another example method in accordance with the present disclosure includes, at bleed station 29, performing a cut to the neck region of the animal 12 (e.g., from ear to ear) severing both jugular veins and both carotid arteries. Subsequently, at saw station 30, a circular saw can be used to split the sternum thereby exposing the chest cavity (e.g., heart, lungs, major veins and arteries, etc.). With the chest cavity exposed, the superior vena cava can be cut (e.g., via an incision or severing with an implement such as knife). Having the chest cavity exposed prior to cutting the vena cava can allow the worker to more easily locate and cut the vena cava without severing other major vessels, which would result in reduced rinsing quality. Previous approaches to cutting the vena cava might involve using an implement designed to puncture the hide and/or exterior skin of the animal. However, using such methods may not allow the worker to accurately locate the vena cava and can result in damage to various major vessels in the area of the vena cava (e.g., the aortic arch, thoracic aorta, pulmonary trunk, brachiocephalic artery, subclavian artery, etc.). This rinsing method can also include using the heart of the animal 12 as the introduction location for the rinse solution, with the majority of the solution exiting the circulatory system through the cut vena cava and jugular veins. As shown at 35-1 ("VC CUT Option 1") in FIG. 1, the vena cava can be cut prior to reaching the rinse station 32 or at the rinse station 32 as shown at 35-2 ("VC CUT Option 2).

With the vena cava cut, rinsing proceeds at station 32 with residual blood being removed from the animal 12 via the rinse solution moving through the circulatory system and carrying out residual blood primarily through the jugular veins and vena cava. Embodiments of the present disclosure are not limited to a particular rinse solution and may comprise various solutions of water and one or more of the following being non-limiting examples: maltose and dextrose, ascorbic acid, sodium tripolyphosphate, hydrolyzed milk protein, papain or bromelin or ficin, potassium sorbate, tetrazolium pyrophosphate and sodium citrate. Additionally, water soluble polysaccharide gum and/or calcium chloride, sodium chloride and potassium chloride may be included.

Figure 2A:
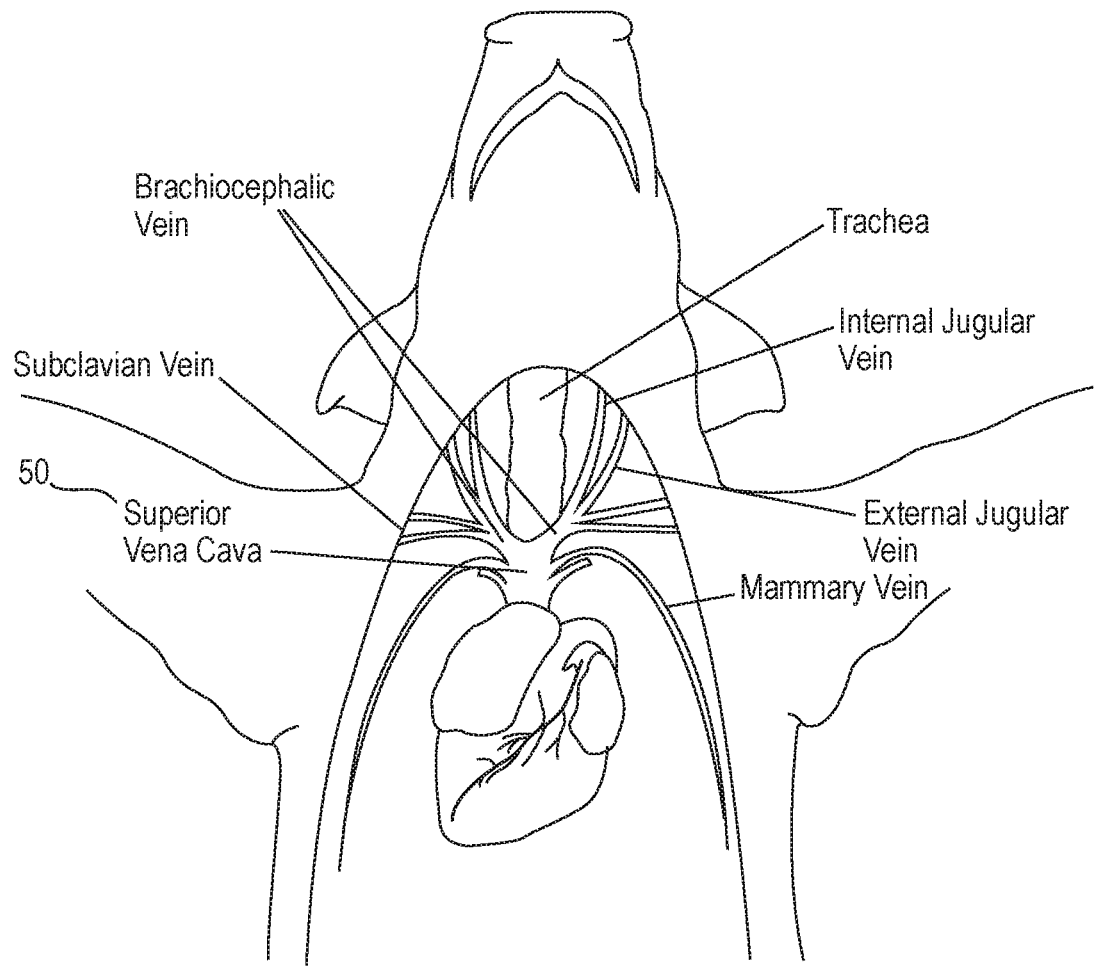
FIG. 2A is a schematic diagram illustrating a number of major veins in a thorax and neck region of a porcine animal.

FIG. 2A is a schematic diagram illustrating a number of major veins in a thorax and neck region of a porcine animal. In FIG. 2A, the superior vena cava 50 is shown as well as a number of other major vessels associated with the circulatory system of a porcine animal. Although FIG. 2A illustrates a porcine animal, as described herein above, embodiments are not limited to porcine animals.

Figure 2B:
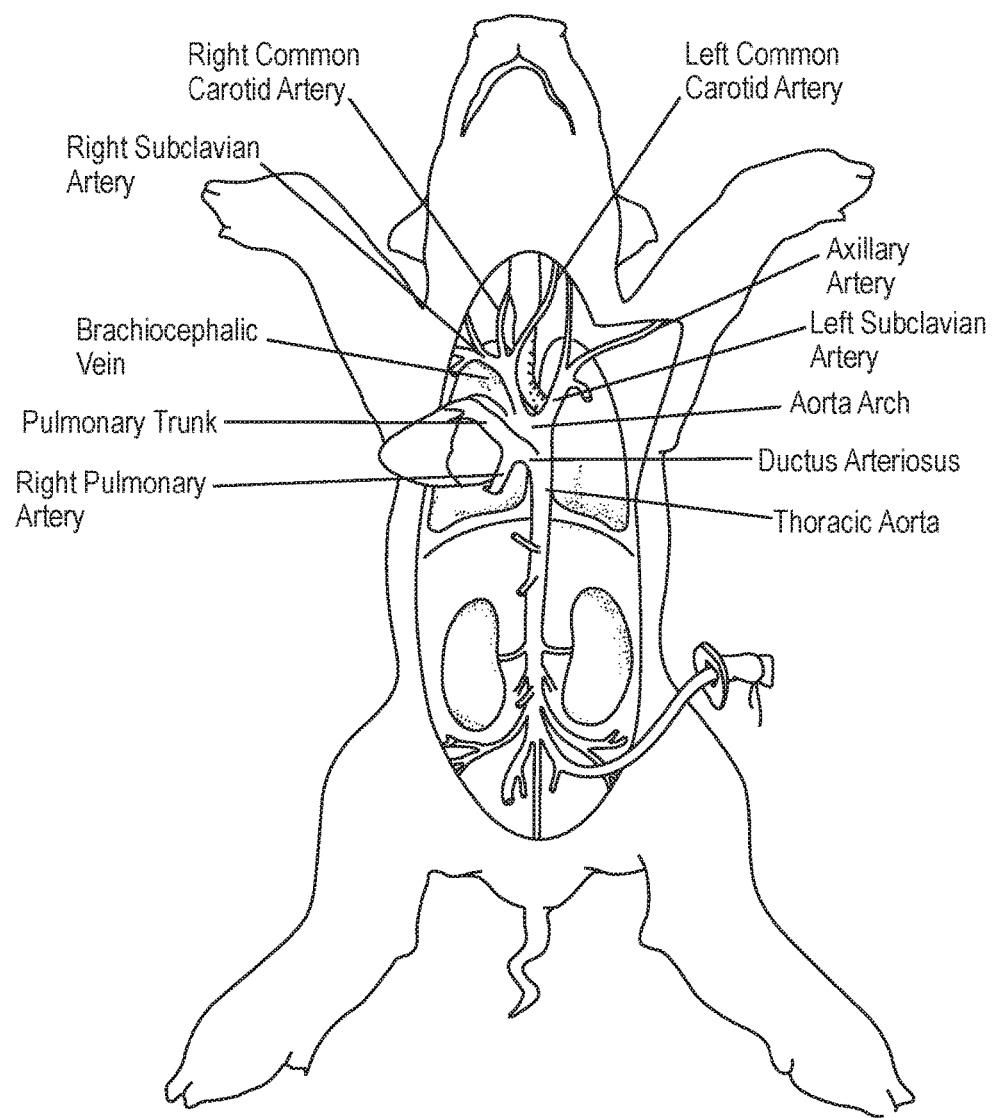
FIG. 2B is a schematic diagram illustrating a number of major arteries of a porcine animal.

FIG. 2B is a schematic diagram illustrating a number of major arteries of a porcine animal. FIG. 2B illustrates various major arteries that may be inadvertently cut in association with a rinsing process, which can reduce the effectiveness of the rinse, for example.

FIG. 3 illustrates an example method 300 for improved meat processing in accordance with a number of embodiments of the present disclosure. At 310, the method includes performing a first cut in association with a rinsing process performed on an animal, wherein performing the first cut includes severing at least one jugular vein of the animal. At 320, the method includes subsequent to performing the first cut, performing a second cut that includes one of: making an incision in a vena cava of the animal that provides an exit location for treatment solution introduced into a circulatory system of the animal; and severing the vena cava of the animal such that the severed vena cava provides an exit location for treatment solution introduced into the circulatory system of the animal. A number of embodiments can include opening a chest cavity of the animal to expose at least a portion of the circulatory system of the animal prior to performing the second cut, for example.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for meat processing, comprising:
performing a first cut in association with a rinsing process performed on an animal, wherein performing the first cut includes severing at least one jugular vein of the animal;
subsequent to performing the first cut, performing a second cut that includes one of:
making an incision in a vena cava of the animal that provides an exit location for treatment solution introduced into a circulatory system of the animal; and
severing the vena cava of the animal such that the severed vena cava provides an exit location for treatment solution introduced into the circulatory system of the animal.

2. The method of claim 1, wherein the exit location for treatment solution created via the second cut is an exit location in addition to an exit location for treatment solution associated with the severed at least one jugular vein created via the first cut such that the exit location created via the second cut reduces a pressure within the circulatory system of the animal during the rinsing process.

3. The method of claim 1, wherein the method includes, prior to performing the first cut and subsequent to performing the second cut, making an incision in a carotid artery of the animal to serve as an entry location for treatment solution.

4. The method of claim 1, wherein the method includes introducing a treatment solution into the circulatory system of the animal subsequent to performing the first cut and prior to performing the second cut.

5. The method of claim 1, wherein the vena cava is a superior vena cava.

6. The method of claim 1, further including performing the second cut subsequent without penetrating a hide or exterior skin of the animal with an implement used to make the second cut.

7. The method of claim 1, wherein the animal is a bovine animal.

8. The method of claim 1, wherein performing the second cut that includes the one of making the incision in the vena cava and severing the vena cava further includes performing the second cut without severing other major veins or arteries of the animal.

9. A method for meat processing, comprising:
performing a first cut in association with a rinsing process performed on an animal, wherein performing the first cut includes severing a jugular vein of the animal;
opening a chest cavity of the animal to expose at least a portion of the circulatory system of the animal;
subsequent to performing the first cut, performing a second cut that includes one of:
making an incision in a vena cava of the animal; and
severing the vena cava of the animal.

10. The method of claim 9, wherein severing the jugular vein of the animal via the first cut includes severing a pair of jugular veins and a pair of carotid arteries of the animal via the first cut.

11. The method of claim 9, wherein the method includes performing the second cut subsequent to opening the chest cavity such that the second cut is performed without penetrating a hide of the animal with an implement used to make the second cut.

12. The method of claim 9, wherein opening the chest cavity includes using a saw to split a sternum of the animal.

13. The method of claim 9, including stunning the animal prior to performing the first cut.

14. The method of claim 9, wherein the vena cava is a superior vena cava.

15. The method of claim 9, further including introducing a treatment solution into the circulatory system of the animal.

16. The method of claim 15, further including introducing the treatment solution into the circulatory system via a heart of the animal, wherein at least a portion of the treatment solution exits the circulatory system via the one of the incision in the vena cava and the severed vena cava.

17. The method of claim 9, wherein the animal is selected from the group including a porcine animal and an ovine animal.

18. An apparatus for meat processing, comprising:
a carrier system to move animals to a number of meat processing stations;
a bleeding station at which a first cut is performed, the first cut comprising cutting at least one jugular vein of animals to be rinsed;
a saw station at which a chest cavity of animals to be rinsed is opened to expose at least a portion of the circulatory system of the animals;
a rinsing station at which a rinsing solution is injected into the circulatory system of the animals; and
a vena cava cut location at which a second cut is performed, wherein performing the second cut comprises one of:
making an incision in a vena cava of the animals; and
severing the vena cava of the animals; and
wherein the vena cava cut location is positioned at the rinsing station or at a location prior to the animals reaching the rinsing station.

19. The apparatus of claim 18, further comprising a weigh station.

* * * * *